United States Patent [19]

Fiedler

[11] 4,253,315
[45] Mar. 3, 1981

[54] REFRIGERATED AIR DRYER

[75] Inventor: Martin Fiedler, Wooddale, Ill.

[73] Assignee: Arrow Pneumatics, Inc., Mundelein, Ill.

[21] Appl. No.: 12,855

[22] Filed: Feb. 16, 1979

[51] Int. Cl.³ ............................................. F25D 17/04
[52] U.S. Cl. ........................................ 62/404; 55/337; 62/93; 165/176
[58] Field of Search ................... 62/93, 474, 475, 503, 62/512, 404; 55/337; 165/176

[56] References Cited

U.S. PATENT DOCUMENTS

| 3,499,270 | 3/1970 | Paugh | 55/337 |
| 3,722,583 | 3/1973 | Fiedler | 165/176 |

Primary Examiner—Ronald C. Capossela
Attorney, Agent, or Firm—Trexler, Wolters, Bushnell & Fosse, Ltd.

[57] ABSTRACT

There is disclosed an air dryer system for removing moisture from compressed air. The system includes a coil means including a plurality of axially spaced convoluted tubing sections wherein each tubing section has an inlet adapted to be coupled to the compressed moist air to be dried and an outlet. The system further includes a cooling means for reducing the temperature of the moist air within the tubing sections for causing the moisture within the compressed air to condense for forming moisture laden air at the outlets, and a moisture separater directly connected to each of the tubing sections for removing the condensed moisture from the moisture laden air to thereby provide dried air for use by pneumatically operated or controlled tools or the like.

5 Claims, 6 Drawing Figures

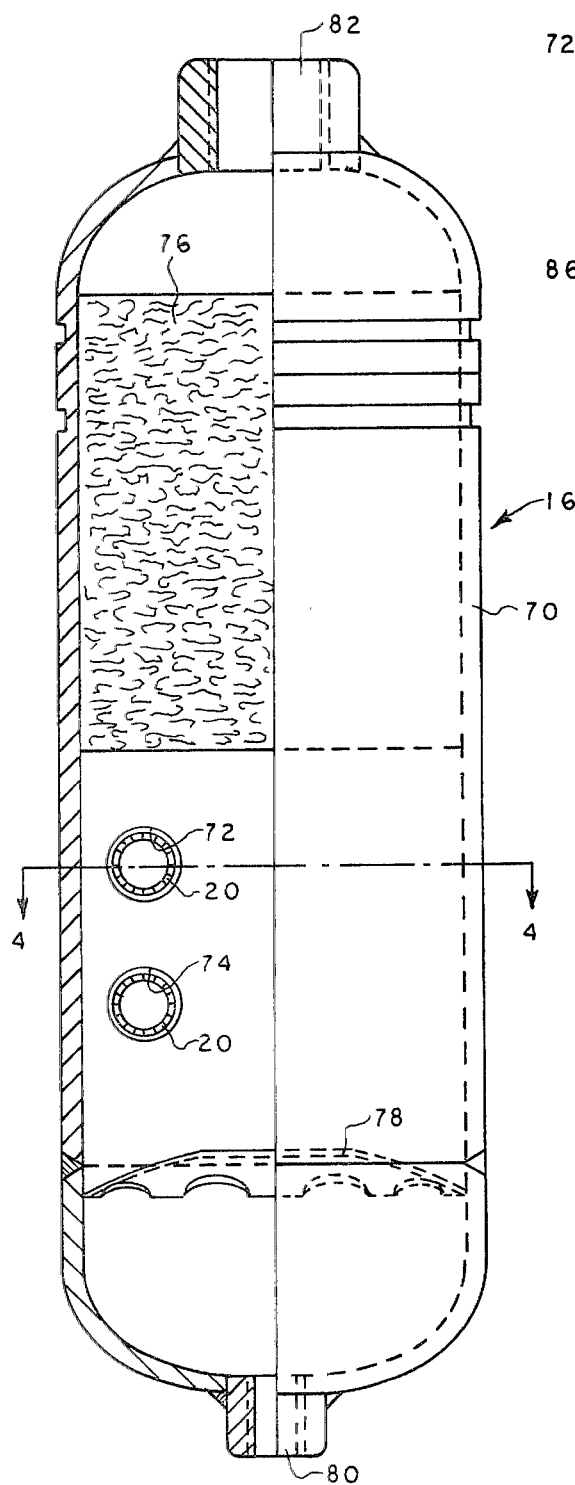
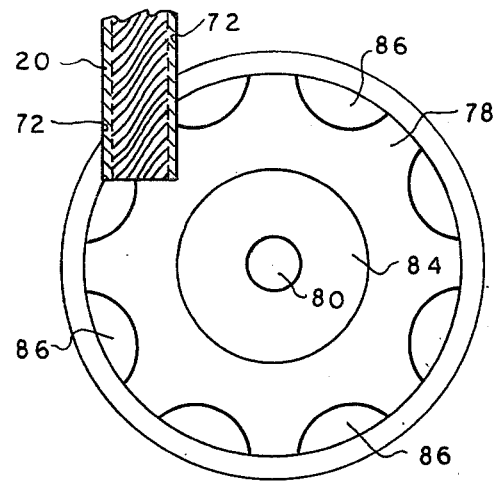
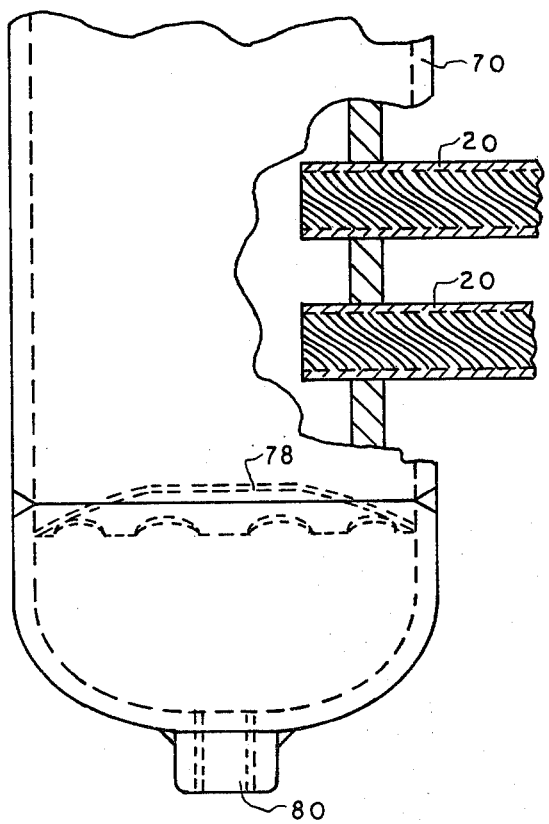
FIG. 3
FIG. 4
FIG. 5

REFRIGERATED AIR DRYER

BACKGROUND OF THE INVENTION

The present invention is generally directed to compressed air systems, and more particularly to apparatus for removing moisture from compressed air, prior to use.

In today's modern manufacturing and assembly plants, pneumatically operated tools and pneumatically controlled machines are used extensively. These machines and tools are, for the most part, expensive and subject to corrosive damage occasioned by the presence of moisture in the compressed air operating systems. This corrosion and rusting, in part, results in excessive maintenance and ultimate replacement. Further, the operation of sensitive pneumatic instruments and controls, coupled to these systems, is materially affected by excessive moisture in the air. In addition to the corrosive action, the water vapor often will contain numerous impurities and contaminants such as oil, dust and pipe scale that can and do produce harmful results upon condensing of the water vapor.

So long as the water vapor remains in suspension, there is little danger of damage in moist compressed air systems. It is only when the water vapor condenses to produce free water, that damage occurs.

Numerous forms of air dryers have been proposed and are presently in use. One example is the absorbent type of air dryer which employs a large chamber or tank within which a dessicant is stored. The compressed air is passed through the tank, prior to being supplied to the air line, with the dessicant absorbing a considerable amount of vapor. However, the operating and recharging costs of this type of air dryer are high.

Another form of air dryer which has found considerable use in such systems is a refrigerated air dryer. One such refrigerated air dryer system is fully disclosed in U.S. Pat. No. 3,722,583, which issued on Mar. 27, 1973 to the assignee of the present invention. In this type of dryer, the relatively hot compressed air is brought into contact with a refrigerant carrying coil to lower the air temperature and produce condensation of the water vapor, which is then collected in a moisture separater. Most importantly, this type of air dryer is capable of lowering the dew point of the air, such that there is little or no chance of subsequent condensation occurring. While this type of air dryer has been found to be quite effective for removing moisture from compressed air prior to use by pneumatically operated machinery, there remains room for improvement. For example, the system disclosed in the aforementioned patent contemplates that a moisture separater be employed downstream from the refrigerant carrying coil for separating the condensed moisture from the air to be dried. In practice, it has been necessary to connect the air cooling portion of the system to the moisture separater by a tubing which, usually of necessity, must be provided with bends along a rather circuitous route to the moisture separater for conveying the cooled air to the moisture separater. The rather circuitous route of the tubing results in a considerable amount of agitation of the cooled air with the result that a significant portion of the condensed moisture is re-evaporated into the cooled air and is not collected by the moisture separater. As a result, at least some moisture remains in the air which is utilized by the pneumatically controlled machinery. This of course, as stated above, it undesirable.

It is therefore an object of the present invention to provide a new and improved air dryer system.

It is a more particular object of the present invention to provide an air dryer system which is considerably more effective in removing moisture from compressed air to be utilized by pneumatically controlled and operated machinery.

It is a still further object of the present invention to provide a new and improved refrigerated air dryer system which includes a moisture separater connected directly to the air cooling portion of the system to thereby eliminate the need for long expanses of coupling tubing between the air cooling portion of the system and the moisture separater.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

FIG. 3 is a side view, partly in cross sections, of a moisture separater embodying the present invention;

FIG. 4 is a cross sectional view taken along line 4—4 of FIG. 3;

FIG. 5 is a partial side view of the moisture separater of FIG. 3 with portions cut away.

DESCRIPTION OF THE PREFERRED EMBODIMENT

Figure 1:
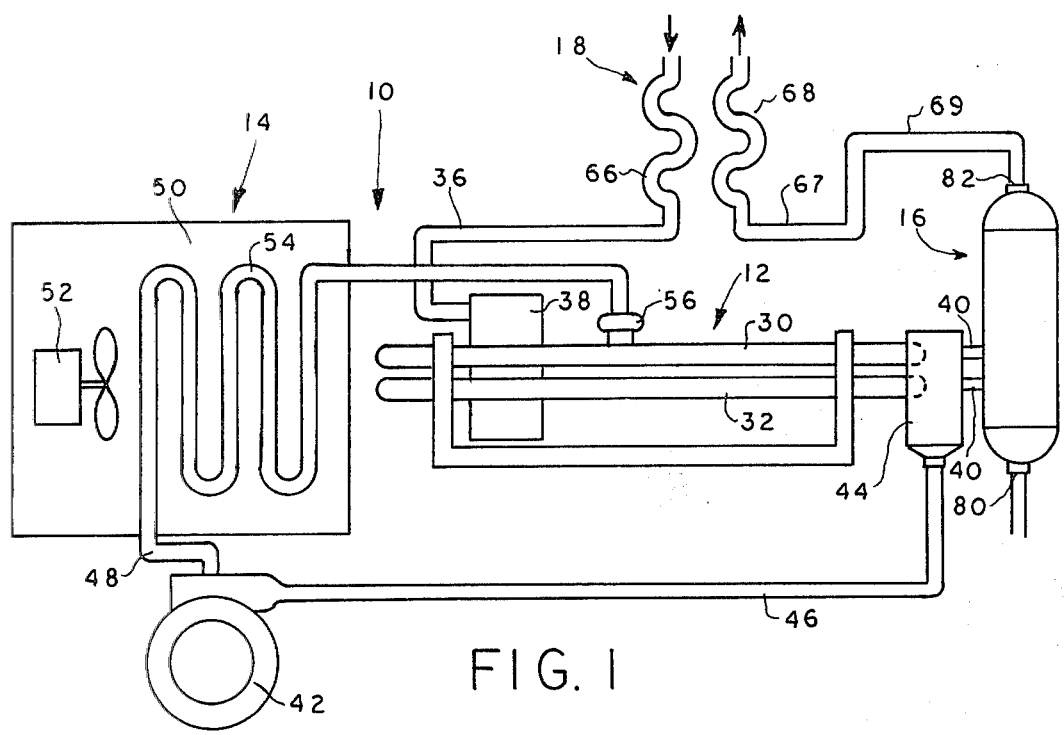
FIG. 1 illustrates a refrigerated air drying system constructed in accordance with the present invention with a refrigerant regenerating section shown schematically and with the heat exchanger and moisture separater sections shown in side plan view.

Referring now to FIG. 1, the system thereshown for the refrigerated drying of compressed air is designated generally 10 and is constructed in accordance with the present invention. The system includes a heat exchanger section 12, a refrigerant regenerating section 14, and a moisture or water separater 16, also embodying the present invention. A review of the overall operation of the system will be first set forth to facilitate better understanding of the present invention.

Initially the air, upon leaving the compressor (not shown), will be at a temperature of approximately 300 degrees fahrenheit, depending, of course, on the compression ratio or other factors. Immediate cooling of this air will take place preferably in an after-cooler (not shown), such that the air entering the section 12 of the system 10 will be at approximately 100 degrees fahrenheit. The heat exchanger section 12 preferably includes a pre-cooler unit 18 into which the compressed air will initially pass. In the pre-cooler unit 18, the relatively hot incoming air is placed in heat exchanging relationship with tubing or coils carrying previously cooled dried air to attain a primary cooling effect. As can be realized, this primary cooling will greatly enhance the overall efficiency of the system. After passing through the pre-cooler 18, the incoming air will enter the main heat exchanger portion 12 where it is subjected to the cooling effect of a refrigerant supply by the refrigerant regenerating section 14.

As was mentioned previously, the temperature of the air entering the system is approximately 100 degrees fahrenheit. The action of the pre-cooler will reduce the air temperature somewhat, producing a small degree of condensation. However, as the air is brought into heat exchange relationship with the refrigerant carrying portion of the system, its temperature is reduced to approximately 35 degrees fahrenheit, which produces further condensation and lowers the dew point of the air to approximately 35 degrees fahrenheit. Accordingly, after the air leaves the system, there is little danger of further condensation in the supply line or in the pneumatically operated devices.

Figure 6:
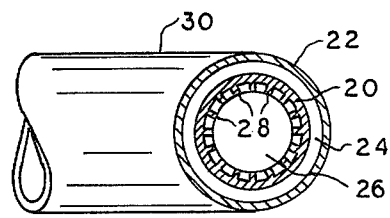
FIG. 6 is a cross sectional view taken along lines 6—6 of FIG. 2.

In order to facilitate a further understanding of the present invention, attention is now directed to FIG. 6 which is a cross-sectional view of the tubing utilized in the coil structure for the heat exchanger portion 12 of the system of FIG. 1. There it can be seen that the tubing which comprises the coils of the system is formed from an inner tubular member 20 and an outer tubular member 22. The tubing members 20 and 22 are substantially coaxially disposed with the inner tubing 20 having an outer diameter which is smaller than the inner diameter of the outer tubing 22. As a result, an annular passage 24 is formed between the inner tubing 20 and outer tubing 22. A central passage 26 is further formed within the inner walls of the inner tubing 20. Also, and in accordance with the aforementioned U.S. Pat. No. 3,722,583, the inner tubing 20 is of substantially circular cross section and is provided with a plurality of radially inwardly extending fins 28. These fins 28 are preferably helically disposed along the length of the inner tubing member 20 as can best be seen in FIGS. 4 and 5. The fins 28, as will become more clear subsequently, serve a number of rather important functions. They provide a vastly increased surface area for the conduction of heat, produce a turbulence in the air being cooled as it passes through the inner tubing to assure rapid heat transfer, and further, provide added strength to the inner tubing 20.

Figure 2:
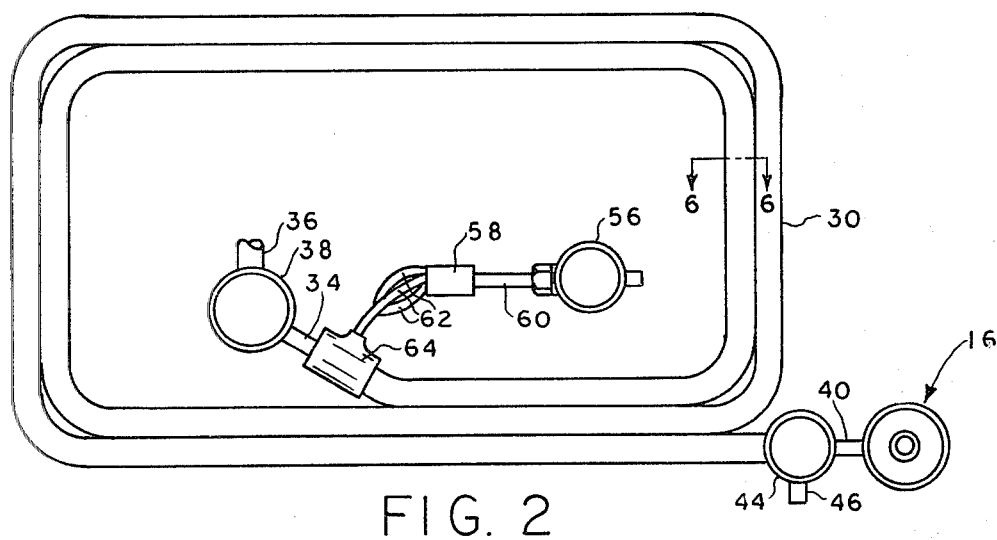
FIG. 2 is a top plan view of one coil construction that may be employed in the system of FIG. 1.

Referring now to FIGS. 1 and 2, the heat exchanger portion 12 includes a plurality of axially spaced coils 30 and 32 which are formed from a plurality of convoluted tubing sections. Preferably, the coils 30 and 32 are formed from the tubing previously described and shown in FIG. 6. As seen in FIG. 2, each of the coils has an inlet 34 coupled to the hot moist compressed air to be dried carried by tubing 36 of pre-cooler 18 through a common manifold 38. The inner tubing of each of the coils is connected to the common manifold 38, and it is through the central passage 26 that the air to be dried is carried by the coils. Each of the coils also includes an outlet 40 coupled to the moisture separater 16. Because the coils 30 and 32 are axially spaced apart, the outlets 40 are also axially spaced apart as they make connection to the moisture separater 16.

The refrigerant generating section 14 is connected across the annular passageways of each of the coils 30 and 32. The refrigerant regenerating section includes primarily a compressor 42 which receives a refrigerant from the outlet of the annular passages of the coils 30 and 32. To this end, each outlet annular passage of the coils 30 and 32 is connected to a common manifold 44 for the refrigerant which is coupled to the compressor 42 by a conduit 46. Refrigerant in the form of a low pressure gas is drawn into the compressor 42 by the suction created in the conduit 46. Once in the compressor, the refrigerant, initially in the form of a gas, is compressed by the action of the compressor pistons and is delivered through the discharge conduit 48 to the condenser 50. The condenser 50 includes a fan 52, as well as numerous coils of finned tubing 54 surrounded by air or some other medium such as water providing a heat sink. In the condenser 50, the combined action of the fan 52 and the finned tubing 54 releases heat from the refrigerant gas to the heat sink. This loss of heat causes the high pressure, refrigerant gas to revert to its liquid state. Accordingly, upon leaving the condenser 50, the refrigerant is in the form of a high pressure liquid, and it is necessary to employ some type of metering device such as valve 56 to control entry of the refrigerant into the inlets of the annular passages of the coils 30 and 32. The valve 56 may, for example, be an expansion valve and is connected to a distributor housing 58 having an inlet 60 and a plurality of outlet ports, each port being connected to a section of tubing 62. The individual sections of tubing 62 are, in turn, operatively connected to supply fittings 64 which connect the individual tubings 62 with respective ones of the coils 30 and 32.

Upon entering the annular passages of the coils 30 and 32, the refrigerant will boil and evaporate, tending to withdraw heat from the surrounding area, thus producing the desired cooling effect of cooling the moist compressed air to be dried carried by the inner passages of the coils 30 and 32. It is during this operation that the refrigerant reverts back to a low pressure gas which is then recycled through the compressor 42 and condenser 50 in the manner described above.

As previously mentioned, the central passage of the coils 30 and 32 provides the air passageway for the moist compressed air to be dried. It will be noted that the inlet of the central passages of the coils 30 and 32 are at the discharge portion of the pre-cooler unit 18. The pre-cooler unit 18 has two sets of coils 66 and 68 in heat exchanging relationship. The coils 66 receive the hot, moist air initially, which is subject to the cooling effect of the coils 68 that now contain the dry, cooled air. This action produces a slight, but significant lowering of the air temperature.

The pre-cooled air then proceeds into the main heat exchanger portion of the system 10, where it is subjected to the cooling effect of the refrigerant carried in the annular passages of the coils 30 and 32. The temperature of the air is lowered to approximately 35 degrees fahrenheit which produces relatively rapid condensation of the water vapor. The moisture laden air thus produced is then transmitted to the moisture separater 16 which is directly connected to the outlets 40 of the inner passages of the coils 30 and 32. In the moisture separater 16, all water, dirt and other contaminants are removed from the air stream and these will flow through and be discharged from an outlet 80 of the moisture separater 16. The cooled, dried compressed air is not conveyed out of the water separater 16 through another outlet 82 into a conduit section 69 which is connected to the coil arrangement 68. The dried air then passes through the coil arrangement 68 and ultimately to the point at which the air is to be used to operate a pneumatic device.

Referring now to FIGS. 3 and 5, there it can be seen that the water separater 16 includes a generally cylindrical housing 70, a first outlet 82 through which the dried compressed air passes, and a second outlet 80 through which collected moisture and contaminants are discharged. The housing 70 further includes a plurality of inlets 72 and 74 which are axially spaced apart and arranged to receive the inner tubing 20 of the coils 30 and 32. In the upper portion of the housing 70 is a demister pad 76 and intermediate the inlets 72 and 74 and the second outlet 82 is disposed across the cylindrical housing a baffle 78. The baffle 78 as best seen in FIG. 4 includes a central apperture 84 and a plurality of peripheral appertures 86.

Also as best seen in FIG. 4, the inlets 72 and 74 are arranged to direct the moisture laden air received from the central passages 20 of the coil outlets substantially tangentially to the inner wall of the housing. As a result, circular flow of the moisture laden air within the housing is promoted.

The baffle 78 serves to shield the collected moisture and contaminants from the circular flow of the moisture laden air above the baffle. Thus, it is assured that the moisture, once collected, will not be mixed with the air flowing circularly within the cylindrical housing 70.

After the moisture laden air is received into the housing through the inlet 72 and 74 and caused to flow circularly therein to afford collection of the condensed moisture below the baffle 78, the air then passes through the demister pad 76 to the outlet 82. The demister pad 76 serves to further filter any water droplets which may be suspended within the circulating air flow to assure that the air passing through the outlet 82 is dry for utilization by pneumatic devices.

By virtue of the fact that the water separater 16 is directly coupled to the outlets of the inner tubing 20 of the coils 30 and 32, it is assured that substantially all of the moisture condensed during the cooling of the hot moist compressed air will be collected by the water separater 16 to provide dry air for the pneumatic devices connected thereto. In practice, it has been found that this arrangement reduces the dew point of the air to be dried to a 35 degrees fahrenheit dew point which is measured at a pressure of 100 pounds per square inch. The system of the present invention therefore lowers the dew point of the air to be dried to such an extent that operation of pneumatic devices by the air dried by the present system will be afforded without corrosion or rusting of the pneumatic devices. Hence, from the foregoing, it can be appreciated that the present invention provides a new and improved refrigerated air dryer for drying hot compressed moist air within compressed air systems.

While a particular embodiment of the present invention has been shown and described, modifications may be made, and it is therefore intended to cover in the appended claims all such changes and modifications which fall within the true spirit and scope of the invention.

This invention is claimed as follows:

1. An air dryer system for removing moisture from compressed air comprising: coil means including a plurality of axially spaced convoluted tubing sections, each said tubing section comprising an outer tubing and an inner tubing, said outer and inner tubings being substantially coaxially disposed with said inner tubing having an outer diameter which is smaller than the inner diameter of said outer tubing forming an annular passage therebetween and a central passage within the inner walls of said inner tubing, wherein said central passage includes an inlet adapted to be coupled to the compressed moist air to be dried and an outlet; a source of refrigerant, said annular passage being coupled to said source of refrigerant for reducing the temperature of the moist air within said tubing sections for causing the moisture within the compressed air to condense for discharging condensed liquid and air at said outlets; and separating means located immediately adjacent to and directly coupled with each said tubing section central passage outlet for removing the condensed liquid for said air.

2. A system as defined in claim 1 wherein said inner tubing includes a plurality of fins formed on the inner wall thereof and disposed in a helical pattern to strengthen said tubing sections and facilitate heat exchange.

3. A system as defined in claim 1 wherein said separating means comprises a substantially cylindrical housing having a first outlet at one end for the dried air, a second outlet at its other end for discharging the separated condensed liquid, and a plurality of axially spaced inlets adapted to be coupled to said tubing section outlets.

4. A system as defined in claim 3 wherein said separating means inlets are arranged for directing the condensed liquid and air received from said tubing section outlets substantially tangentially to the inner wall of said housing for promoting circular flow of said condensed liquid and air within said housing.

5. A system as defined in claim 4 wherein said separating means further includes a baffle disposed intermediate said housing inlets and said second outlet for shielding the collected liquid from said circular flow of said air.

* * * * *

UNITED STATES PATENT AND TRADEMARK OFFICE
CERTIFICATE OF CORRECTION

PATENT NO. : 4,253,315
DATED : March 3, 1981
INVENTOR(S) : MARTIN FIEDLER

It is certified that error appears in the above-identified patent and that said Letters Patent are hereby corrected as shown below:

Column 2, line 2, change "it" to --is--;

Column 4, line 61, change "not" to --now--;

Column 6, line 27, second occurence, change "for" to

--from--.

Signed and Sealed this

Sixteenth Day of June 1981

[SEAL]

Attest:

RENE D. TEGTMEYER

Attesting Officer  Acting Commissioner of Patents and Trademarks